Figure 1:
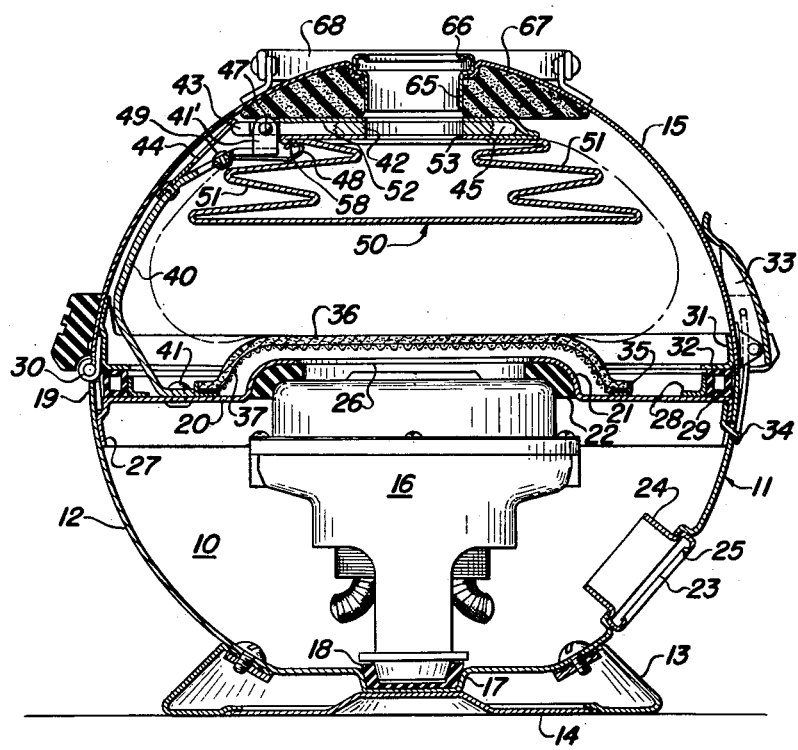

Aug. 27, 1957　　　G. A. BRACE　　　2,804,164

FILTER MOUNTING MEANS

Filed Jan. 12, 1955　　　2 Sheets-Sheet 1

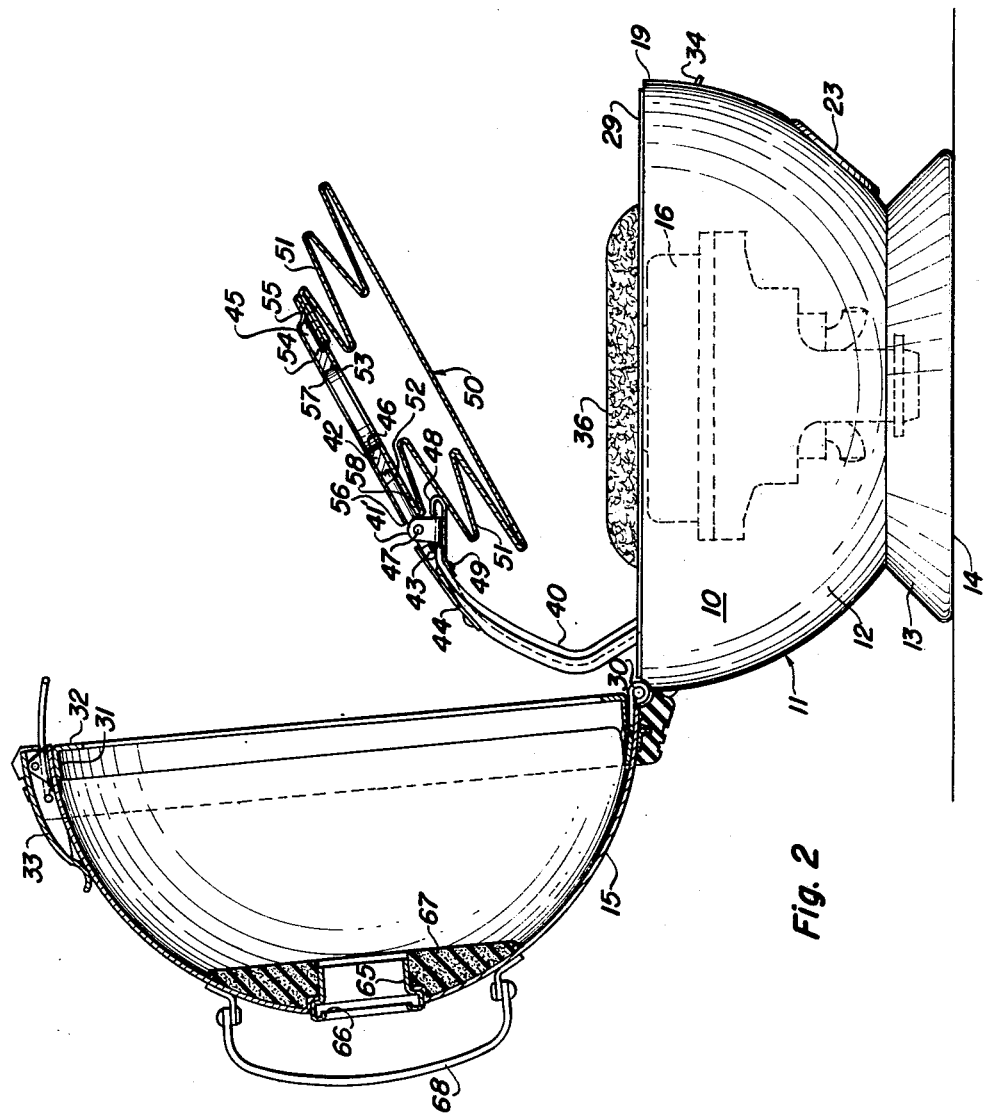

United States Patent Office 2,804,164
Patented Aug. 27, 1957

2,804,164

FILTER MOUNTING MEANS

George A. Brace, San Carlos, Calif., assignor to The Hoover Company, North Canton, Ohio, a corporation of Ohio Application January 12, 1955, Serial No. 481,309

14 Claims. (Cl. 183—37)

The instant invention relates to suction cleaners and more particularly to a novel means for mounting a filter bag in a suction cleaner.

It is a prime object of this invention to provide a novel means for mounting a filter bag having a mounting pocket in a suction cleaner.

It is also an object of this invention to provide a novel filter mounting means in a suction cleaner for mounting a filter bag having formed therein a mounting pocket, the novel mounting means comprising an element adapted to be received in the pocket and cooperating therewith to secure the filter bag within the cleaner.

It is another object of this invention to provide a novel mounting means for a filter bag formed with an inlet opening in one wall thereof and a filter mounting pocket on that one wall. The novel mounting means preferably comprises a plate or the like which is adapted to be received in the pocket for mounting the filter bag within the cleaner, and associating the inlet thereof with the air inlet conduit of the cleaner, providing an airtight seal at the junction of the air inlet conduit and the filter bag inlet. In accordance with the instant invention sealing of the filter bag within the cleaner in the requisite manner is accomplished automatically upon assembling the filter bag on the mounting means and closing the cleaner for operation thereof.

It is another object of this invention to provide a novel means for mounting a filter bag in a cleaner, in which the inlet mouth of the filter bag is constantly biased towards the air inlet conduit of the cleaner to maintain the connection of the inlet mouth therewith.

It is a further object of the instant invention to provide a novel mounting means for a filter bag in a suction cleaner in which there is included a seat for mounting the filter bag with the mouth thereof juxtaposed on the seat, and means for urging the mouth of the filter bag towards the air inlet conduit of the cleaner to maintain a connection between the mouth of the bag and the air inlet conduit.

Another object of the instant invention is to provide a novel mounting means for a filter bag in a suction cleaner having a seat for mounting the filter bag and including means for securing the bag to the seat.

Still another object of the instant invention is to provide a novel mounting means for a filter bag in a cleaner in which the mounting means is operative to present the filter bag for removal thereof from the cleaner, the means for presenting the filter bag being operative upon separation of the air inlet conduit from the mouth of the filter bag.

It is also an object of the instant invention to provide a novel filter bag mounting means which is particularly adapted for use with a canister cleaner having a spherical casing, the latter comprising two hemispherical sections separable one from the other to provide access to the filter bag for removal of the same.

A further object of the instant invention is to provide a novel mounting means for a filter bag in a suction cleaner including a seat for the filter bag which is adapted to locate the mouth thereof in aligned position with the air inlet conduit for connection thereto, and including means for gripping the filter bag on the seat when the mouth thereof is connected to the air inlet conduit, said gripping means also providing an airtight seal of the filter bag on the seat.

Figure 3:
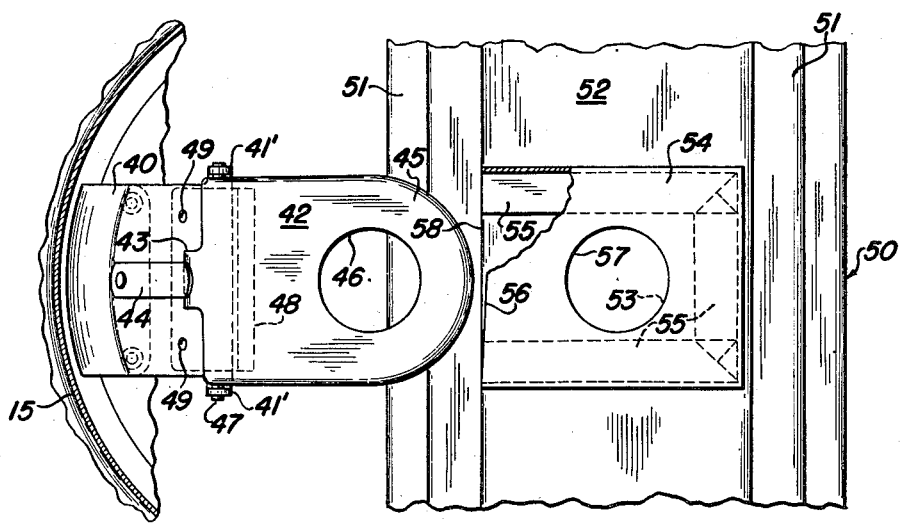

Further objects and advantages of the instant invention in a novel mounting means for a filter bag will be apparent to those skilled in the art upon consideration of the following description of a preferred embodiment thereof, reference being had to the drawings in which, Figure 1 is an elevational view in section of a spherical suction cleaner incorporating the instant invention, Figure 2 is an elevational view of the suction cleaner of Figure 1 with the hemispherical casing sections separated one from the other, and Figure 3 is a partial plan view of the novel filter bag mounting means illustrating the mode of mounting the filter bag thereon.

This invention in filter bag mounting means is directed primarily to suction cleaners utilizing disposable filter bags. The latter are usually made of air pervious paper, providing a relatively inexpensive filter bag which may be used until it is filled with dust and like litter to the extent that it is no longer effective as a filter, at which time it is removed from the cleaner and disposed of, and replaced by a clean filter bag of like construction. However, it will be understood by those skilled in the art that the invention is not so limited and may be utilized in conjunction with filter bags of other forms as well.

In accordance with the instant invention the filter bag is provided with a mounting pocket which is adapted to receive a seat mounting the bag in the cleaner. The filter bag including the mounting pocket, which the instant invention is intended to utilize, is described and claimed in the applicant's copending application Serial No. 481,340, filed on January 12, 1955. The invention as disclosed herein comprises a supporting element which is adapted to be received in the mounting pocket provided on the filter bag, said element being in turn mounted within the cleaner casing for supporting the filter bag therein. Sealing means is included for sealing the filter mounting pocket on the supporting element, and also providing the requisite seal at the junction of the dirty air stream inlet conduit of the cleaner and the inlet mouth in the filter bag, to discharge said air stream into the filter bag for separating the dust and like litter and retaining the same within the confines of the bag.

Referring to the drawings, the invention is illustrated as embodied in a suction cleaner 10 of the canister type, comprising a spherical casing 11 having a lower hemispherical casing section 12 supported on a suitable base 13 with a flat under surface 14 for permitting sliding movement of the cleaner from one position to another. An upper hemispherical casing section 15 is joined to the lower casing section 12 on a diametrically disposed junction line. A conventional motor-fan unit 16 is contained within the lower casing section 12 and is supported at its bottom in a centrally disposed well 17 on a resilient, vibration absorbing seat 18.

The lower casing section 12 is covered just below its rim 19 by a partition 20 formed with a central, downwardly facing recess 21 providing a seat for an annular, resilient vibration absorbing ring 22 against which the upper end of the motor-fan unit 16 abuts. The motor-fan unit 16 exhausts through an outlet 23 in the wall of the lower casing section 12. The exhaust outlet 23 includes a short conduit 24 terminating in an annular latch engaging lip 25 disposed on the wall of the lower casing section 12 for the reception of a hose formed with spring latches.

The central area 26 of the partition 20 in the bottom of the recess 21 is cut away to provide communication between the motor-fan unit 16 and the filter bag 50 as will be described hereinafter. The periphery of the partition 20 is formed with an integral, depending flange 27 secured to the inner surface of the lower casing section 12 as by welding or the like, fastening the partition 20 in place. An annular L-section element 28 is secured to the upper surface of the partition 20 with the upstanding leg thereof spaced inwardly from the rim 19 of the lower casing section 12, and provides an annular channel co-extensive therewith. A resilient sealing gasket 29 is secured within the channel projecting above the rim 19 of the lower casing section 12.

The upper hemispherical casing section 15 is secured to the lower casing section 12 by a hinge 30. An L-section annular element 31 is secured to the inner surface of the upper casing section 15 as by welding or the like, adjacent the lower edge thereof. The L-section element 31 provides an inwardly directed shoulder 32 co-extensive with the rim 19 of the lower casing section 12, and is adapted to abut the gasket 29 upon joining of the casing sections to form therewith an airtight seal at the junction of said casing sections. The upper and lower casing sections are maintained in sealed relationship by a suitable toggle latch 33 mounted on the upper casing section 15 opposite the hinge 30 and gripping a lip 34 projecting from the lower casing section 12.

An inwardly facing L-section annular element 35 is secured to the upper surface of the partition 20, as by welding or the like, surrounding the central recess 21, and provides a seat for the secondary filter 36. The secondary filter 36 includes a rigid backing element 37 preferably made of wire mesh and being sufficiently rigid to support the secondary filter 36 in position over the centrally located opening 26 in the partition, maintaining it in spaced relation to the motor-fan unit 16. The secondary filter 36 as thus constructed provides a support for the underside of the primary filter or filter bag. Upon filling of the filter bag 50 with dust and like litter, the weight of the latter will cause it to sag whereby the underside thereof will come into contact with the secondary filter 36 which will support the weight of the bag in order to avoid rupture of the paper. The secondary filter 36 also serves to maintain the primary filter 50 spaced from the motor-fan unit 16 to most effectively apply the suction pressure thereof to the full area of the filter bag 50.

In accordance with the invention the filter bag 50 is suspended in the upper casing section 15 above the secondary filter 36 in order that free access may be had to the bag for removal thereof from the cleaner upon it becoming filled with dust and like litter to a point where it is no longer effective as a filter. The novel filter mounting means comprises an upstanding supporting arm 40 secured to the partition 20 by rivets 41 or the like, and projecting upwardly therefrom into the upper casing section 15. The supporting arm 40 generally follows the contour of the upper casing section 15 and is closely spaced adjacent the inner surface thereof, in order to fully utilize the volume of the upper casing section in expanding the filter bag 50 upon operation of the cleaner. The supporting arm 40 is formed from an elongated plate terminating in a square end having oppositely disposed and integrally formed upstanding ears 41'. A seat 42 for the filter bag 50 is pivotally secured to the supporting arm 40 by trunnions 47 received in the ears 41'. A rearwardly extending portion 43 of the seat 42 forms a tail overlying the upper end of the supporting arm 40, and is engaged by the free end of a leaf spring 44 secured to the arm below the upper end thereof to constantly bias the seat 42 in an upward direction for a purpose to be described.

The filter bag 50 illustrated in the drawings is specially fabricated for use with the novel filter mounting means of this invention. It is to be understood, however, that other forms of filter bags may be used with equal facility in conjunction with the novel filter mounting means disclosed herein, and that the form illustrated is merely exemplary.

The filter bag 50 is formed with pleated side walls 51 so that it may be fabricated in folded flat form for convenience in packaging and shipping. The pleats in the side walls 51 are staggered one with respect to the other in pyramid fashion so that the filter bag 50, when expanded upon operation of the motor-fan unit, will assume a configuration generally corresponding to that of the interior of the upper casing section 15, to utilize the full volume thereof. A flat wall 52 of the filter bag 50 includes an inlet mouth 53 formed therein for connection with the air inlet conduit 65 of the cleaner. Overlying the mouth 53 there is provided a flat mounting pocket 54 of rectangular form, although it may assume other shapes as well. In the illustrated embodiment the pocket 54 is separately formed from the filter bag 50 with inwardly directed flaps 55 on three edges thereof, which may be adhered to the wall 52 of the filter bag 50 beyond the inlet mouth 53, leaving one edge 56 of the pocket 54 open. The pocket 54 also includes a circular opening 57 of the same size as the inlet mouth 53 and disposed in alignment therewith. Although the pocket 54 is illustrated as being fabricated separately from the filter bag 50 it may also be made integrally therewith, in the manner described in the applicant's co-pending application Serial No. 481,340, filed on January 12, 1955.

The filter bag seat 42 is adapted to be received within the pocket 54 for mounting the filter bag in the cleaner. In the illustrated embodiment the seat 42 has a profile which is complementary to that of the pocket 54 and includes a rounded nose 45 for facilitating insertion thereof into the pocket 54, although it is contemplated that the seat may be formed with other shapes as well. In assembling the filter bag 50 on the seat 42, the latter overlies the inlet mouth 53 and accordingly is formed with a round opening 46 of a size equal to that of the mouth 53 to provide communication with the interior of the filter bag 50. The pocket 54 is of such size as to snugly embrace the seat 42 so as to prohibit any leakage of air from between the pocket 54 and the seat 42. In order to further insure an airtight seal of the filter bag mouth 53 on the seat 42 there is provided a spring tongue 48 extending substantially the width of the seat 42 and adapted to engage a pleat 58 of the filter bag 50. The spring tongue 48 engages the pleat 58 over an area underlying the seat 42 and the pocket 54, to press the filter bag and the pocket 54 against the underside of the seat 42 as shown in Figure 1, to secure the filter bag 50 and the pocket 54 in airtight sealed engagement with the seat 42.

The spring tongue 48 is secured to the upper end of the supporting arm 40 by rivets 49 or the like, and projects beyond the end thereof to underlie the seat 42. The spring tongue 48 is also operative to grip the filter bag 50 on the seat 42 to retain it thereon except when the upper and lower casing sections 12, 15 are separated, in the manner shown in Figure 2, at which time the seat 42 is biased to its upward position by the leaf spring 44; the filter bag 50 is then freely supported on the seat 42 and may be removed therefrom merely by sliding it off the seat. The upward pivoting movement of the seat 42 to present the bag 50 for removal is limited by abutment of the tail 43 on the end of the arm 40, thereby fixing the uppermost position of the seat 42. The spring tongue 48 serves the additional function of urging the seat 42 towards the air inlet conduit 65 to maintain a connection between it and the filter bag mouth 53, as is described in greater detail below.

Centrally located in the top of the upper casing section 15 is an air inlet conduit 65 terminating in an annular inwardly directed latch engaging lip 66 for the reception of a cleaning tool hose formed with spring latches.

Surrounding the air inlet conduit 65 is a resilient gasket 67 presenting a planar surface of a substantial area disposed slightly below the end thereof. Upon closing of the upper casing section 15, the gasket 67 abuts the filter bag 50 in opposition to the seat 42 to provide an airtight seal between the filter bag mouth 53 and the air inlet conduit 65. The opening in the seat 42 is disposed in alignment with the air inlet conduit 65 in order that upon assembly of the cleaner the conduit 65 will also be aligned with the mouth 53 of the filter bag 50 to discharge dust and like litter thereinto. A carrying handle 68 is secured to the upper casing section 15 in any suitable manner, and is arranged to permit pivoting thereof to one side of the air inlet conduit in order to provide access to the latter.

In utilizing the instant invention the upper casing section 15 is separated from the lower casing section 12, as illustrated in Figure 2, to expose the filter mounting means. In this condition the filter seat 42 will be biased or urged upwardly about its trunnions 47 by the leaf spring 44 to place it in an upwardly directed position for facility in mounting the filter bag thereon. The pocket 54 on the filter bag 50 is placed in alignment with the seat 42 and telescoped thereon to the extent necessary for aligning the opening 46 in the seat with the mouth 53 of the bag. The upper casing section 15 may then be pivoted downwardly and the gasket 67 will contact the pocket 54 of the filter bag 50 and the seat 42 forcing the latter downwardly in opposition to the bias of the leaf spring 44. In the process of forcing the seat downwardly the pleat 58 of the filter bag 50, underlying the seat 42, will abut the spring tongue 48 and the latter will press the pleat 58 against the underside of the seat 42 thereby gripping the filter bag and securing it thereto. Further downward pivoting of the seat 42 is in opposition to the bias of the spring tongue 48, as well as the bias of leaf spring 44, whereby the springs are operative to urge the seat 40 upwardly against the sealing gasket 67 and maintain the connection between the air inlet conduit 65 and the filter bag mouth 53. Since the air inlet conduit 65 is disposed in alignment with the openings in the filter bag 50 and the seat 42, upon closing the upper casing section 15, the air inlet conduit 65 will automatically be connected to the mouth 53 of the filter bag. The filter bag as thus mounted in the cleaner is suspended on the support arm 40 within the confines of the upper casing section 15.

For removal of a filled filter bag from the cleaner the reverse procedure is followed. The upper casing section 15 is separated from the lower casing section 12, whereupon the bias of the spring tongue 48 and the leaf spring 44 will urge the seat 42 upwardly, and the bias of the leaf spring 44 operating on the tail 43 of the seat 42 will continue the movement of the seat 40 upwardly on its trunnions 47, presenting the filter bag 50 at a position where it is conveniently slid off the seat 42 for removal from the cleaner. The tail 43 abuts the support arm 40 and limits the upward pivoting movement of the seat 42. With the seat 42 presenting the filter bag 50 as thus described the spring tongue 48 is spaced from the underside of the seat 42 and the filter bag 50 is released therefrom for removal from the cleaner.

The foregoing description is of a preferred embodiment of the instant invention. Modifications thereof falling within the scope of the invention will occur to those skilled in the art and, accordingly, it is not intended that the scope of the invention be limited except as set forth in the claims which follow.

I claim:

1. In a suction cleaner having a motor-fan unit for generating a suction air flow for gathering dirt and like litter, a fitting positioned in the dirty air stream for leading dirty air to a filter bag, a filter bag interposed in the dirty air stream for receiving dirty air from said fitting, for separating the dust and the like litter therefrom and for retaining the same within the confines of the bag, said filter bag including an inlet mouth in one wall thereof for the admission of dirty air stream from said fitting and a mounting pocket on said one wall, said mounting pocket being formed by an outer wall spaced from said one wall with an opening therein in alignment with said inlet mouth and by three lateral walls forming three side walls of said pocket leaving one wall open for the lateral insertion of a supporting member into said pocket and supporting means for said bag including a member laterally insertable into said pocket for supporting said bag with said inlet mouth and the opening in said outer wall of said pocket in alignment with said fitting and being formed to permit the passage of dirty air from said fitting into said filter bag.

2. In a suction cleaner according to claim 1 in which said mounting means includes a plate insertable laterally into said pocket having an opening in alignment with said inlet mouth to provide for the flow of dirty air into said filter bag and including means for forcing the outer wall of said pocket against said fitting to form a seal between said bag and fitting.

3. In a suction cleaner according to claim 2 in which said mounting means includes means for pressing said pocket about said plate at its open side for forming a seal between said pocket and plate.

4. In a suction cleaner having a motor-fan unit for the production of a suction air flow, an inlet conduit for the admission of a dirty air stream, a filter bag having an air inlet mouth and a mounting pocket surrounding said inlet mouth, said pocket including an outer wall having an opening in alignment with said inlet mouth and three lateral side walls leaving one side of said pocket open for the lateral insertion of a mounting means, mounting means for said bag for suspending said bag with said inlet mouth in alignment with and in juxtaposition to said air inlet including a seat movably mounted on said cleaner and laterally receivable in said pocket, said seat providing for the passage of air through said inlet mouth into said filter bag and normally disposing said inlet mouth in alignment with and in juxtaposition to said air inlet conduit and means for biasing said seat out of alignment with said air inlet conduit to a bag removing position to dispose said bag for lateral movement from said seat.

5. In a suction cleaner according to claim 4 including means associated with said seat for gripping said bag and holding it on said seat, said gripping means being movable out of contact with said bag when said seat is moved to its bag removing position.

6. In a suction cleaner having a motor-fan unit for the production of a suction flow of air, an air inlet conduit for the admission of a dirty air stream, means for mounting a filter bag having an inlet mouth comprising, an upstanding arm secured to the cleaner for suspending the bag within the cleaner interposed in the path of the dirty air stream between the air inlet conduit and the motor-fan unit for separating dust and like litter from the air stream and retaining the same within the confines thereof, a seat on the arm, means pivotally mounting said seat on one end of the arm, said seat seating the filter bag with the mouth in alignment with the air inlet conduit for connection thereto, means for connecting the air inlet conduit to the mouth, means gripping the filter bag on the seat for securing it thereto upon connection of the mouth to the air inlet conduit, said gripping means being biased to urge the seat and the filter bag mouth toward the air inlet conduit, biasing means urging the seating means to a position separating the bag from the gripping means upon disconnection of the mouth from the air inlet conduit for removal of the bag from the cleaner.

7. In a suction cleaner having a pair of casing sections joined together to enclose a motor-fan unit for the production of a suction flow of air, and a filter bag having an inlet mouth, one of said casing sections being separable from the other casing section to expose the filter bag for providing access thereto, said one casing section including an air inlet conduit for connection with the inlet mouth of the filter for the admission of a dirty air stream thereto, means for mounting the filter bag in the cleaner with the bag interposed in the air stream between the air inlet conduit and the fan for separating dust and like litter from the air stream and retaining the same within the confines of the bag comprising, a support for suspending the filter bag in the cleaner, means on the support for seating the filter bag with the mouth thereof in alignment with the air inlet conduit for connection of the mouth thereto, said one casing section being movable towards the seating means for connecting the air inlet conduit to the filter bag mouth, and means urging the filter bag mouth towards the air inlet conduit upon connecting the conduit and the mouth for maintaining the mouth and the conduit in constant connection, the last said means gripping the filter bag on the seating means for securing the bag thereto.

8. In a suction cleaner as recited in claim 7 including means pivotally mounting the seating means on the support, and biasing means urging the seating means to a position separating it and the filter bag from the gripping means upon disconnection of the filter bag mouth from the air inlet conduit, in which position the seating means presents the filter bag for removal from the cleaner.

9. In a suction cleaner having a pair of casing sections joined together to enclose a motor-fan unit for the production of a suction flow of air, and a filter bag having an inlet mouth, one of said casing sections being separable from the other casing section to expose the filter bag for providing access thereto, said one casing section including an air inlet conduit for connection with the inlet mouth of the filter and for the admission of a dirty air stream thereto, means for mounting the filter bag in the cleaner with the bag interposed in the dirty air stream between the air inlet conduit and the fan for separating dust and like litter from the air stream and retaining the same within the confines of the bag comprising, a rigid arm having one end thereof secured to the cleaner forming a support for suspending the filter bag within the cleaner, means for seating the filter bag with the mouth thereof in alignment with the air inlet conduit for connection of the mouth thereto, said one casing section being movable towards the seating means for connecting the air inlet conduit to the filter bag mouth, means on the support pivotally mounting the seating means, and means interposed between the arm and the seating means operative upon separation of said one casing section from the other casing section to pivot the seating means to a position presenting the filter bag for removal thereof from the cleaner.

10. In a suction cleaner as recited in claim 9 including means on the arm abutting the bag in opposition to the seating means upon connecting the air inlet conduit to the filter bag mouth to secure the bag thereto.

11. In a suction cleaner as recited in claim 10 in which the abutting means is resiliently biased to urge the seating means and the filter bag mouth towards the air inlet conduit to maintain the connection therebetween.

12. In a suction cleaner having a pair of casing sections joined together to enclose a motor-fan unit for the production of a suction flow of air, a filter bag having an inlet mouth and a mounting pocket disposed in juxtaposition to the mouth, one of said casing sections being separable from the other casing section to expose the filter bag for providing access thereto, said one casing section including an air inlet conduit for connection with the inlet mouth of the filter for the admission of a dirty air stream thereto, means for mounting the filter bag in the cleaner with the bag interposed in the air stream between the air inlet conduit and the fan for separating dust and like litter from the air stream and retaining the same within the confines of the bag comprising, a support for suspending the filter bag in the cleaner, means on the support for seating the filter bag with the mouth thereof in alignment with the air inlet conduit for connection of the mouth thereto, said seating means being receivable within the mounting pocket and including an opening aligned with the mouth for providing access to the interior of the bag, said one casing section being movable towards the seating means for connecting the air inlet conduit to the filter bag mouth, means adapted to abut the mounting pocket in opposition to the seating means upon connecting the conduit and the mouth to form an airtight seal between the pocket and the mouth.

13. In a suction cleaner as recited in claim 12, in which said seating means comprises a plate complementally formed with respect to the mounting pocket, means pivotally mounting the plate on the support, said plate being movable from the position connecting the mouth of the bag to the air inlet conduit to a position releasing the mounting pocket from the abutting means upon separation of the air inlet conduit from the filter bag mouth.

14. In a suction cleaner as recited in claim 13, in which said means abutting the mounting pocket is biased to urge the seating means towards the air inlet conduit for maintaining connection of the mouth with the conduit, and spring means urging the seating means to its position releasing the mounting pocket from the abutting means upon separation of the air inlet conduit from the filter bag mouth.

References Cited in the file of this patent
UNITED STATES PATENTS

| 808,170 | Rogers | Dec. 26, 1905 |
| 2,652,902 | Sheahan | Sept. 22, 1953 |

FOREIGN PATENTS

| 17,705 of 1913 | Great Britain | Aug. 1, 1913 |